United States Patent [19]

Stroud

[11] 4,454,464
[45] Jun. 12, 1984

[54] PULSAR ROTOR SYSTEM AND COIL WINDING

[76] Inventor: Lebern W. Stroud, 321 Charleston Pl., Hurst, Tex. 76053

[21] Appl. No.: 331,643

[22] Filed: Dec. 17, 1981

[51] Int. Cl.$^3$ .......................... H02P 9/02; H02P 9/11
[52] U.S. Cl. ........................................ 322/28; 307/84; 310/198; 322/61; 219/133
[58] Field of Search ................... 307/84; 322/7, 8, 28, 322/61, 90, 94, 95, 96; 310/198, 208

[56] References Cited

U.S. PATENT DOCUMENTS

| | | | |
|---|---|---|---|
| 3,710,226 | 1/1973 | Seike | 322/28 X |
| 3,727,122 | 4/1973 | Hughes et al. | 322/28 X |
| 4,161,683 | 7/1979 | Stroud et al. | 322/87 |
| 4,330,715 | 5/1982 | Stroud et al. | 322/28 X |

Primary Examiner—R. J. Hickey

[57] ABSTRACT

An automatic feedback and control system for operating a load off of a multi-phase rectified rotary field system of a motor vehicle and for increasing the voltage and current to the load upon demand. The multi-phase rectified rotary field system comprises a rotatable coil for forming the rotary field when excited and stationary windings having an output coupled thereto by way of rectifier means. A DC power supply is coupled to said output. A regulator is provided having an input coupled to the DC power supply and and output coupled to the rotatable coil. Non-polarized capacitors are provided and a switch is coupled to the capacitors and to the DC power supply. The switch when closed, electrically connects the capacitors between the stationary windings and the rotatable coil and electrically connects the DC power supply to the rotatable coil. The switch when opened, interrupts the electrical connection of the capacitors between the stationary windings and the rotatable coil and interrupts the electrical connection of the DC power supply with the rotatable coil. Control means is coupled to said output of the regulator for causing the switch to be closed when the output of the DC power supply drops to a given level.

13 Claims, 4 Drawing Figures

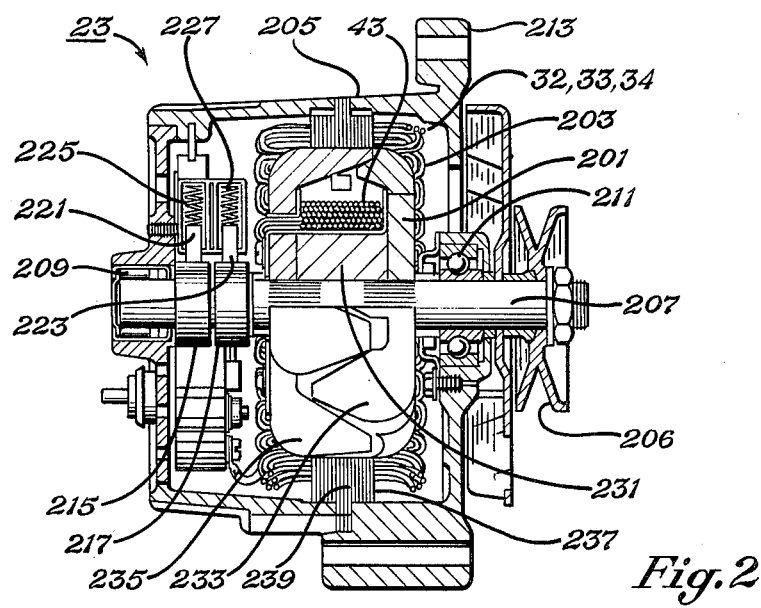
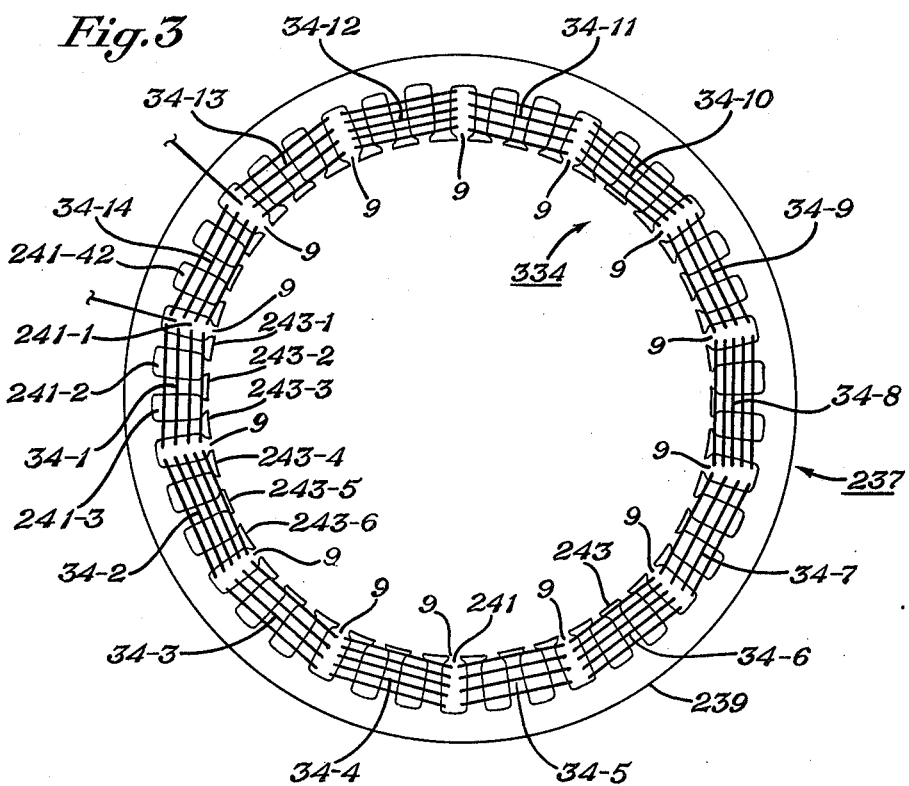

PULSAR ROTOR SYSTEM AND COIL WINDING

FIELD OF THE INVENTION

The present invention relates to an automatic feedback and control system for increasing the voltage and current from the electrical system of a motor vehicle for operating a load such as the emergency equipment of an ambulance.

DESCRIPTION OF THE PRIOR ART

U.S. Pat. No. 3,770,976 discloses a portable welding system comprising a feedback system for operating a welder off of an alternator of a motor vehicle. U.S. patent application Ser. No. 121,989 discloses another type of feedback system.

U.S. Pat. No. 4,161,683 and U.S. patent application Ser. Nos. 33,443, and 153,426 disclose different types of alternator coil windings.

SUMMARY OF THE INVENTION

It is an object of the present invention to provide a new and useful automatic feedback and control system for operating a load off of a multi-phase rectified rotary field system of a motor vehicle and for increasing the voltage and current to the load upon demand.

It is a further object of the present invention to provide a unique and improved stationary coil winding for the multi-phase rectified rotary field system that enables the system to produce a high voltage and current at low engine rpm.

The multi-phase rectified rotary field system comprises a rotatable coil for forming the rotary field when excited and stationary windings having an output coupled thereto by way of rectifier means.

In the system of the present invention, a DC power supply is coupled to said output. Regulator means is provided having an input coupled to said DC power supply and an output coupled to said rotatable coil. Capacitor means is provided and switch means, adapted to be placed in first or second conditions, is coupled to said capacitor means and to said DC power supply. Said switch means when in said second condition, electrically connects said capacitor means between said stationary windings and said rotatable coil and electrically connects said DC power supply to said rotatable coil. Said switch means when in said first condition, interrupts the electrical connection of said capacitor means between said stationary windings and said rotatable coil and interrupts the electrical connection of said DC power supply with said rotatable coil. Control means is coupled to said output of said regulator means for causing said switch means to be placed in said second condition when the output of said DC power supply drops to a given level.

The switch means comprises two contacts adapted to be opened or closed, one of said contacts being connected to said capacitor means and to said DC power supply. The other of said contacts is connected to a transistor which is connected to said rotatable coil. Said control means causes said two contacts to be closed when the output of said DC power supply drops to a given level to allow current from said one contact to flow to the other of said contacts and through said transistor to said rotatable coil.

BRIEF DESCRIPTION OF THE DRAWINGS

FIG. 2 is a cross-section of an alternator.

FIG. 3 illustrates the coil configuration of one phase winding used in the alternators of FIG. 1.

DETAILED DESCRIPTION OF THE PREFERRED EMBODIMENTS

Figure 1:
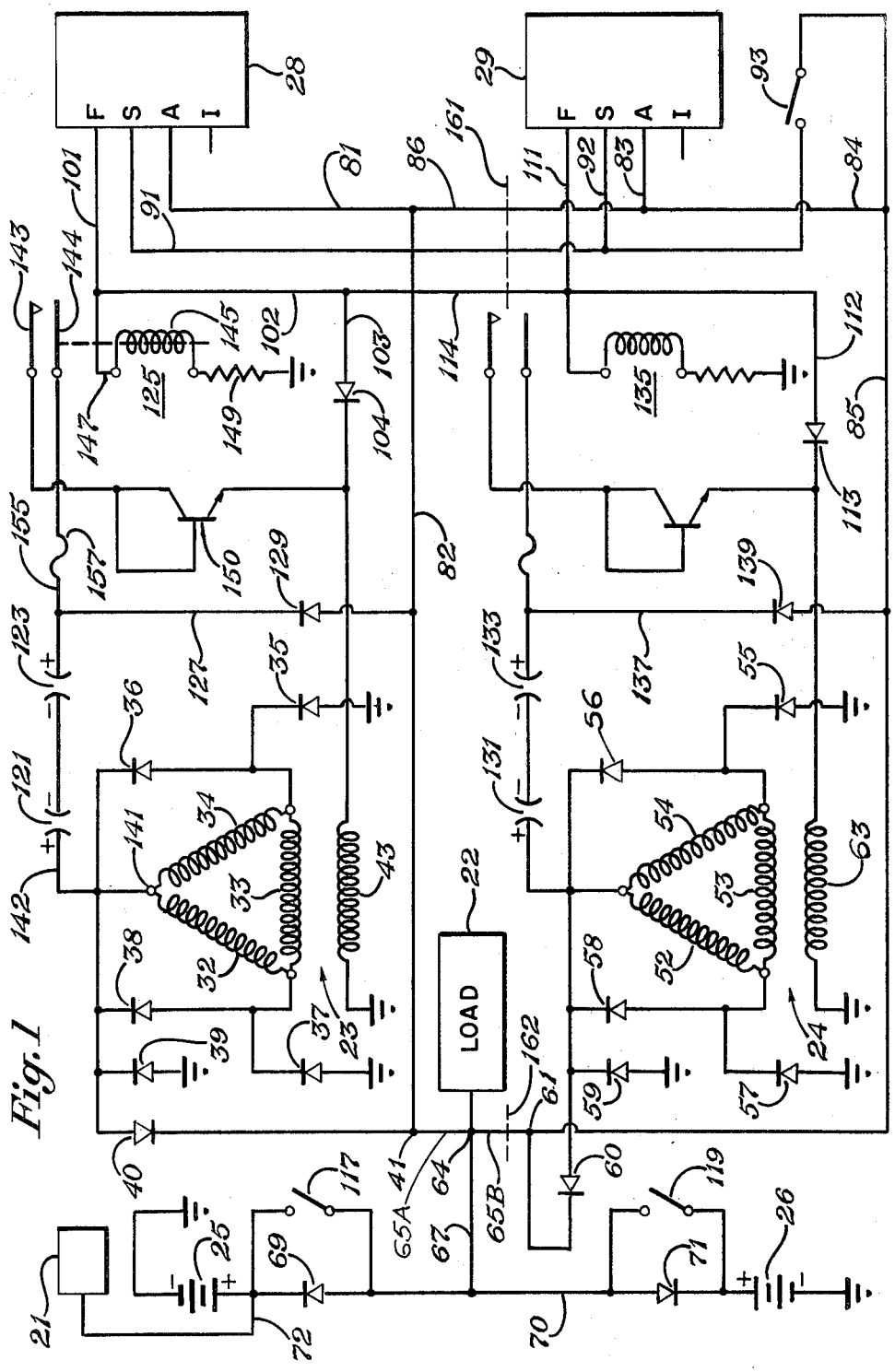
FIG. 1 is an electrical schematic of a system using two alternators and two regulators for charging two batteries and which system incorporates the feedback and control system of the present invention.

Referring now to FIG. 1, the system shown is employed in an emergency vehicle such as an ambulance. The vehicle chassis electrical system such as lights, radio, heating and cooling system, starting circuit, ignition circuit, etc. is depicted by block 21. The electrically operated emergency equipment carried by the ambulance such as a heart machine, breathing equipment, vacuum pumps, lights, power outlets, etc. is depicted by block 22. Reference numerals 23 and 24 identify two alternators employed for charging two batteries 25 and 26 and for supplying power to emergency equipment load 22. One of the batteries (battery 25) supplies power to the vehicle chassis electrical system 21. Two regulators 28 and 29 are provided. Each of the regulators 28 and 29 is connected to each of the alternators 23 and 24. One of the objects of the present invention is to supply all of the current needed by the load 22 and to maintain the batteries 25 and 26 charged during emergency periods, particularly when the emergency vehicle is idling.

The batteries 25 and 26 each are twelve volt batteries. Each alternator comprises a three phase winding for its stator core connected in a delta configuration. In alternator 23, the three windings of the stator, connected in a delta configuration, are identified at 32, 33, and 34. Coupled to the stator windings are diode rectifiers 35–40 which are coupled to output 41. These diodes rectify the AC voltage from stator windings 32–34. The rotor coil is identified at 43. In alternator 24, the three windings of the stator, connected in a delta configuration, are identified at 52, 53 and 54. Coupled to the stator windings are diode rectifiers 55–60 which are coupled to output 61. These diodes rectify the AC voltage from the stator windings 52–54. The rotor coil is identified at 63. Outputs 41 and 61 are coupled to a juncture 64 by way of leads 65A and 65B and from juncture 64 to load 22 by way of lead 66. From juncture 64, the outputs 41 and 61 are coupled to batteries 25 and 26. In this respect, juncture 64 is coupled to lead 67. Lead 67 is coupled to battery 25 by way of lead 68 and diode 69 and to battery 26 by way of lead 70 and diode 71. The electrical system 21 is coupled to lead 68 by way of lead 72.

The A terminals of regulator 28 is coupled to juncture 64 by way of lead 81, lead 82, and lead 65A. The A terminal of regulator 29 is coupled to juncture 64 by way of lead 83, lead 84, lead 85, and lead 65B. The A terminals of regulators 28 and 29 are coupled together by way of lead 81, lead 86, and lead 83. The S terminals of regulators 28 and 29 are coupled together by way of leads 91 and 92. Switch 93 is provided for starting purposes. The F terminal of regulator 28 is coupled to rotor coil 43 by way of lead 101, lead 102, lead 103 and diode 104. The F terminal of regulator 29 is coupled to rotor coil 63 by way of lead 111, lead 112, and diode 113. The F terminal of regulators 28 and 29 are coupled together by way of leads 101, 102, 114, and 111.

For normal operations of the vehicle with no emergency equipment on and hence no emergency load required, switch 117 will be closed and switch 119 will be open. Both batteries 25 and 26 will be charged through diodes 69 and 71. Battery 26 is a back-up battery and is used in the event that battery 25 fails. With the emergency equipment on, switch 117 will be closed and switch 119 will remain open. In the event that battery 25 fails, switch 119 will be closed.

The feedback system of alternator 23 comprises nonpolarized capacitors 121 and 123 coupled to one phase of the stator windings of alternator 23 and to a switch 125 which is coupled to rotor coil 43 and in addition it comprises a lead 127 with a diode 129 coupled to lead 82 and to the switch 125. The feedback system of alternator 24 comprises non-polarized capacitors 131 and 133 coupled to one phase of the stator windings of alternator 24 and to a switch 135 which is coupled to rotor coil 63 and in addition it comprises a lead 137 with a diode 139 coupled to lead 85 and to switch 135.

The feedback systems for alternators 23 and 24 are the same. Thus only the feedback system for alternator 23 will be described in detail. Capacitors 121 and 123 are connected together. Capacitor 121 is connected to stator winding tap 141 by way of lead 142. Switch 125 comprises two movable contacts 141 and 143 controlled by solenoid coil 145. Coil 145 is coupled to the F terminal of regulator 28 by way of lead 147 and lead 101 and to ground by way of resistor 149. Contact 143 is connected to the collector and base of transistor 150 whose emitter is connected to lead 103. Capacitor 123 is connected to contact 144 by way of lead 155 and fuse 157. Lead 127 is connected to lead 82 and also to lead 155. The regulator 28 is operated to maintain the voltage at battery 25 at 14 to 14.5 volts. Contacts 143 and 144 are normally open. When the voltage at the F terminal of regulator 28 increases to 8 volts, current through coil 145 will close the contacts 143 and 144. Since capacitors 121 and 123 are connected in a non-polarized manner they will pass AC from stator tap 141.

When the load 22 draws current and the voltage at battery 25 falls to 12.5 volts, the voltage at the F terminal of regulator 28 will immediately increase to 12 volts. This energizes the coil 145 to close the contacts 143 and 144. When this occurs, the transistor 150 is turned on and allows the AC voltage passed by capacitors 121 and 123 to be applied to the rotor coil 43. This raises the rotor voltage from its normal 12 volts to as high 17 to 20 volts depending on the engine rpm. This increases the flux density from the rotor which results in a 30% increase in current at the output 41 of the alternator 23. Diode 104 is a blocking diode and prevents the high voltage on lead 103 from being applied back to the F terminal of regulator 28. Diode 129 is a feeding and blocking diode. When the voltage on lead 155 (between the voltage pulses) falls below 12 volts, diode 129 allows the voltage on lead 82 to be applied to the rotor coil 43 by way of switch 125 to further increase and stabilize the voltage applied to the rotor coil.

When the voltage at juncture 64 increases, the voltage at the F terminal of regulator 28 starts to decrease. When the voltage at the F terminal of regulator 28 drops to 8 volts, the contacts 143 and 144 will open allowing the regulator to regulate the output of the alternator in its normal manner.

The purpose of the transistor 150 is to prevent arcing across the points of the contacts 143 and 144 as they close thereby allowing a high amount of current to flow through the contacts 143 and 144. As the points of the contacts barely engage each other upon closing, the transistor 150 switches on, absorbing any arcing across the points.

Since each regulator 28 and 29 is connected to both alternators 23 and 24, in the event that one regulator goes out, the other regulator can regulate both alternators. For the dual alternator system shown, regulator 28 is a 14.5 regulator and regulator 29 is a 13.8 regulator.

Although two alternators are shown in FIG. 1 for providing current to the load 22 and for charging the batteries 25 and 26, it is to be understood that only one alternator may be employed. In this alternative embodiment, only alternator 23 and regulator 28 will be employed. The circuitry below the dotted lines 161 and 162 will not be employed.

Referring now to FIGS. 2–3, there will be described one of the alternators used for the dual alternators of the system of FIG. 1. In FIG. 2, the alternator shown is indicated to be alternator 23. Alternator 24 will be constructed in the same manner as alternator 23. As shown in FIG. 2, the alternator 23 comprises a rotor 201 and a stator 203, the latter of which is fixedly carried by a housing or case 205. Rotor 201 is rotatably carried by the case by a shaft 207 which is journaled by roller bearings 209 and ball bearings 211 to the case 205. Brackets 213 formed to the case 205 are adapted to receive bolts for coupling the alternator to mounting means adjacent the engine of the vehicle. A pulley 206 is mounted to the shaft 207 for receiving the belt from the engine for rotating the rotor 201.

Shaft 207 has two slip rings 215 and 217 mounted rigidly to it and insulated from each other and from the shaft. Slip rings 215, 217 are connected by conductors (not shown) to the coil 43 of rotor 201. Carbon brushes 221 and 223 are biased by springs 225 and 227 into sliding contact with the slip rings 215 and 217. Slip rings 215, 217 and brushes 221, 223 provide a connection for applying a D.C. exciting voltage to the rotor 201. A diode rectifier bridge (see FIG. 1) is attached to the inner side of the case 205 and is connected by conductors to the windings 32–34 of the stator 203 for converting the A.C. output to D.C.

Rotor 201 comprises a ferro-magnetic core 231 which is wound with conductive wire defining the rotor coil 43. The opposite sides of the core 231 have end portions which form north and south poles 233 and 235. The poles are formed into seven north poles and seven south poles which extend inward and mesh, but do not touch, with a corresponding pole of the opposite polarity.

Stator 203 comprises an annular core 237 formed of a plurality of stacked ferro-magnetic-plates 239. A plan view of the core 237 is shown in FIG. 3. As seen in this figure, there are forty-two slots 241 formed in the stator core 237. Slots 241 extend parallel to the axis of the core 237 the full width of the core.

In the preferred embodiment, the depth of the slots 241 is slightly more than one half of the radial thickness of the core. The core 237 is approximately 5¼ inches in outside diameter, 13/16 of an inch wide longitudinally and 9/16 of an inch thick radially. The slots 241 are approximately 5/16 of an inch deep, being about 1/16 of an inch wide at the entrance and about ¼ of an inch wide at the inner portion. The forty two portions of the core between the slots 241 are defined as segments 243.

Rotor 201 is carried within the stator core 237, with the poles 233 and 235 being spaced from segments 243.

The three stator winding 32-34 each comprise fourteen loops or coils which are located in the slots 241 of the core 237. Each coil or loop of each winding encircles three segments 243 of the core. Electrically insulating inserts (not shown) are located in the slots between their wall structure and their wires to prevent electrical contact between the wires and the core. The stator windings are connected in a delta configuration as shown in FIG. 1.

Figure 4:
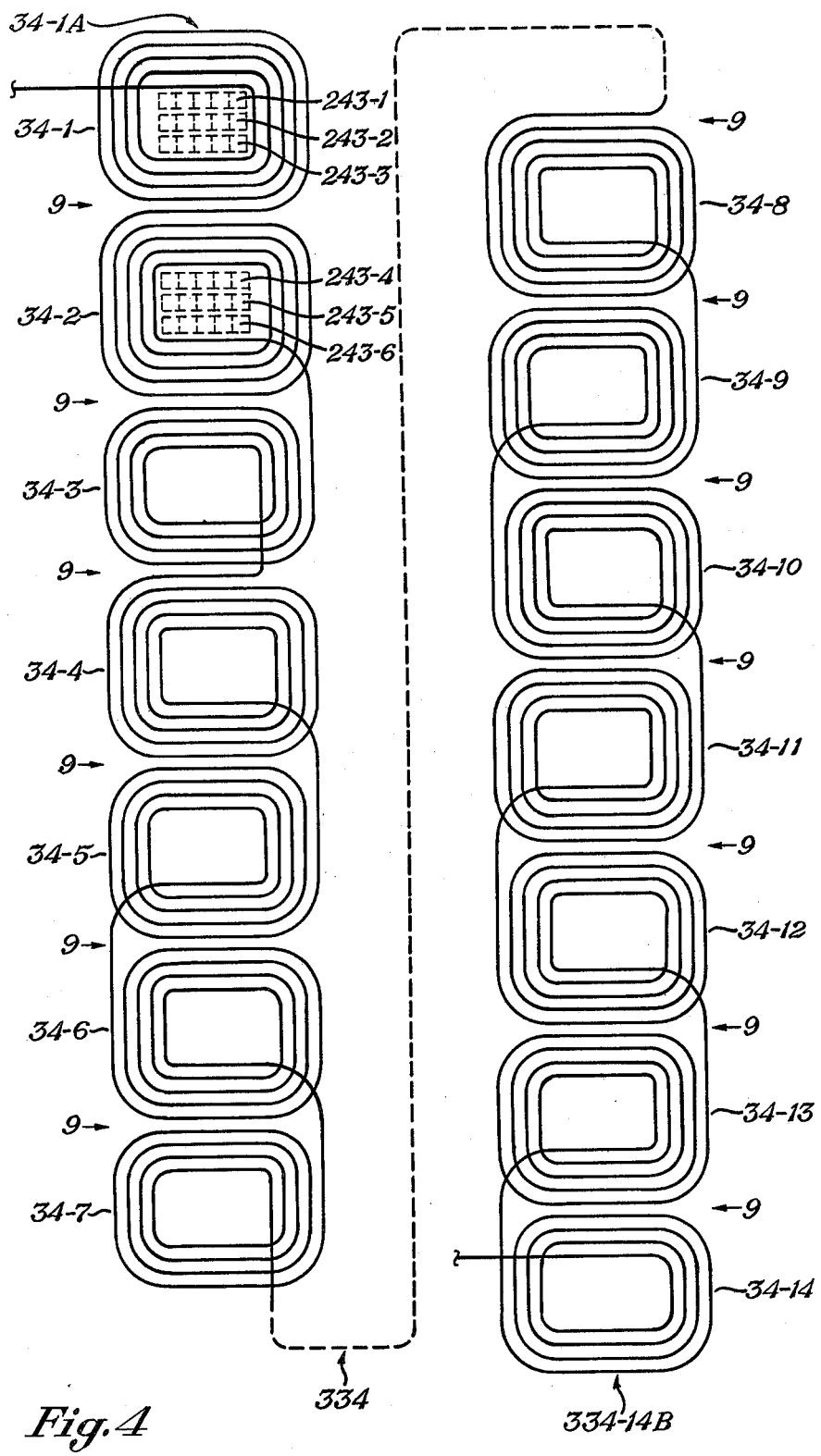
FIG. 4 is a plan view of the stator core of an alternator with the coil winding of FIG. 3 installed around its segments.

The alternators used in the system of FIG. 1 have a unique coil winding configuration for each of their three coil windings which results in the production of voltage and current that will meet all of the requirements of an ambulance at low engine idle rpm. This unique coil winding configuration is shown in FIGS. 3 and 4. Fourteen A.W.G. (American Wire Gage) copper wire is used to form the windings which are connected together in a delta configuration. Reference is made to Buchsbaum's Complete Handbook of Practical Electronic Reference Data, by William Buchsbaum (Prentice-Hall, Inc., 1978) for conversion from A.W.G. to inches.

Referring to FIGS. 3 and 4, the unique coil winding configuration will be described. The coil winding in these figures is for one phase and it is identified as winding 34 of alternator 23. The coil winding configuration for the other two phases, coil windings 32 and 33 is the same as that of coil winding 34. As seen in FIG. 4, the outer edge 34-1A of coil 34-1 has five turns of wire. The outer edge 34-14B of coil 34-14 has four turns of wire. The total turns formed between adjacent coils, from adjacent coils 34-1 and 34-2 to adjacent coils 34-13 and 34-14 are as follows: 9, 9, 9, 9, 9, 9, 9, 9, 9, 9, 9, 9, 9. The turns of the left hand edges of coils 34-1 to 34-14 as seen in FIG. 4 are as follows: 4, 5, 4, 5, 4, 5, 4, 5, 4, 5, 4, 5, 4, 4. The turns of the right hand edges of coils 34-1 to 34-14 as seen in FIG. 4 are as follows: 5, 4, 5, 4, 5, 4, 5, 4, 5, 4, 5, 4, 5, 4.

In the stator core of FIG. 3, edges 34-1A and 35-14B of the coil winding 34 are located in slot 241-1. Starting with slot 241-1 and going counterclockwise, it can be seen that every third slot has the following number of turns of windings 34 located therein: 9, 9, 9, 9, 9, 9, 9, 9, 9, 9, 9, 9, 9, 9.

In FIG. 3, only the edge of the coil winding 34 having the turns 4, 5, 4, 5, 4, 5, 4, 5, 4, 5, 4, 5, 4, 4 is shown. In FIG. 4, core segments 243-1, 243-2, and 243-3 encircled by coil 34-1 and core segments 243-4, 243-5 and 243-6 encircled by coil 34-2 are depicted by dotted lines. In FIG. 4, the relative distance between the segments is not shown to scale.

Each of the coil windings 32 and 33 is the same as coil winding 34. The turns of adjacent coils of windings 32 will be located in every third slot starting with slot 241-42 and going counterclockwise. The outer edges of the outer coils of winding 33 will be located in slot 241-42. Thus starting with slot 243-42 and going counterclockwise, every third slot will have the following number of turns of winding 33 located therein: 9, 9, 9, 9, 9, 9, 9, 9, 9, 9, 9, 9, 9, 9. With the turns of the coils so located in every third slot, each coil or loop of winding 32 will encircle three segments 243. The turns of adjacent coils of winding 33 will be located in every third slot starting with slot 241-2 and going counterclockwise. The outer edges of the outer coils of winding 33 will be located in slot 241-2. Thus starting with slot 241-2 and going counterclockwise, every third slot will have the following number of turns from winding 33 located therein: 9, 9, 9, 9, 9, 9, 9, 9, 9, 9, 9, 9, 9, 9. With the turns of coil 33 so located in every third slot, each coil or loop of winding 33 will encircle three segments 243.

Dual alternators connected as described above, and each having its three winding configurations as described in connection with FIGS. 3 and 4, connected in a delta and formed of fourteen A.W.G. copper wire will produce 150 amps at engine idle speed of 750–850 rpm. A single alternator having the three winding configurations as described in connection with FIGS. 3 and 4, connected in a delta and formed of fourteen A.W.G. copper wire will produce 75 to 80 amps at engine idle speed of 750–850 rpm.

In one embodiment, each of diodes 35-40 and 55-60 of the circuit of FIG. 1 is a 100 amp diode. The rotors 43 and 63 each are 2.8 ohm rotors with 0.002 of an inch clearance between the rotor and stator. Each of capacitors 121, 123, 131, 133 are 2000 mfd. capacitors. Fuse 157 and the corresponding fuse for alternator 24 each is rated at 5 amps. Resistor 149 and the corresponding resistor for switch 135 each is rated at 50 ohms. Each of diodes 104, 129, 113, 139 is rated at 7.5 amps.

I claim:

1. A system coupled to a multi-phase rectified rotary field system of a motor vehicle, said multi-phase system comprising a rotatable coil for forming said rotary field when excited, stationary windings, an output for applying current to a load, and rectifier means coupled to said stationary windings and to said output, said system comprising:

a DC power supply coupled to said output, regulator means having an input coupled to said DC power supply and an output coupled to said rotatable coil, capacitor means, switch means coupled to said capacitor means and to said DC power supply, said switch means being adapted to be placed in first or second conditions, said switch means when in said second condition electrically connecting said capacitor means between said stationary windings and said rotatable coil and electrically connecting said DC power supply to said rotatable coil, said switch means when in said first condition interrupting the electrical connection of said capacitor means between said stationary windings and said rotatable coil and interrupting the electrical connection of said DC power supply with said rotatable coil, and control means coupled to said output of said regulator means for causing said switch means to be placed in said second condition when the output of said DC power supply drops to a given level.

2. The system of claim 1 comprising:

diode means, said switch means when in said second condition electrically connecting said DC power supply to said rotatable coil by way of said diode means.

3. The system of claim 1, wherein:

said capacitor means when electrically connected between said stationary windings and said rotatable coil passes an output from said stationary windings for application to said rotatable coil when the load draws current, said DC power supply when electrically connected to said rotatable coil applies an output to said rotatable coil when the output from said stationary windings passed by said capacitor means falls below the output of said DC power supply, means for preventing the output from said DC power supply from being applied to said rotatable coil when the output from said stationary windings passed by said capacitor means is greater than the output from said DC power supply.

4. The system of claims 1, 2 or 3 wherein:
said capacitor means has one side electrically connected to said stationary windings and an opposite side electrically connected to said rotatable coil when said switch means is in said second condition.

5. The system of claims 1, 2, or 3 wherein said switch means comprises:
two contacts adapted to be opened or closed, one of said contacts being connected to said capacitor means and to said DC power supply,
the other of said contacts being connected to a transistor which is connected to said rotatable coil,
said control means causing said two contacts to be closed when the output of said DC power supply drops to a given level to allow current from said one contact to flow to the other of said contacts and through said transistor to said rotatable coil.

6. A system coupled to a multi-phase rectified rotary field system of a motor vehicle, said multi-phase system comprising a rotatable coil for forming said rotary field when excited, stationary windings, an output for applying current to a load, and rectifier means coupled to said stationary windings and to said output, said system comprising:
switch means adapted to be placed in first or second conditions,
a DC power supply coupled to said rotatable coil by way of said switch means for applying an output to said rotatable coil by way of said switch means when said switch means is in said second condition,
regulator means having an input coupled to said DC power supply and an output coupled to said rotatable coil,
capacitor means coupled between said stationary windings and said rotatable coil by way of said switch means for passing an output from said stationary windings for application to said rotatable coil by way of said switch means when said switch means is in said second condition and when the load draws current,
said switch means when in said first condition interrupting the electrical connection of said capacitor means between said stationary windings and said rotatable coil and interrupting the electrical connection of said DC power supply with said rotatable coil, and
control means coupled to the output of said regulator means for causing said switch means to be placed in said second condition when the output of said DC power supply drops to a given level.

7. The system of claim 6 comprising:
diode means,
said switch means when in said second condition electrically connecting said DC power supply to said rotatable coil by way of said diode means.

8. The system of claim 1, wherein:
said DC power supply when electrically connected to said rotatable coil applies an output to said rotatable coil when the output from said stationary windings passed by said capacitor means falls below the output of said DC power supply,
means for preventing the output from said DC power supply from being applied to said rotatable coil when the output from said stationary windings passed by said capacitor means is greater than the output from said DC power supply.

9. The system of claims 6, 7 or 8 wherein:
said capacitor means has one side electrically connected to said stationary windings and an opposite side electrically connected to said rotatable coil when said switch means is in said second condition.

10. The system of claims 6, 7 or 8 wherein said switch means comprises:
two contacts adapted to be opened or closed, one of said contacts being connected to said capacitor means and to said DC power supply,
the other of said contacts being connected to a transistor which is connected to said rotatable coil,
said control means causing said two contacts to be closed when the output of said DC power supply drops to a given level to allow current from said one contact to flow to the other of said contacts and through said transistor to said rotatable coil.

11. A system coupled to a multi-phase rectified rotary field system, said multi-phase system comprising a rotatable coil for forming said rotary field when excited, stationary windings, an output for applying current to a load, and rectifier means, coupled to said stationary windings and to said output, said system, comprising:
a DC power supply coupled to said output,
regulator means having an input coupled to said DC power supply and an output coupled to said rotatable coil,
normally open switch means having first and second terminals,
said first terminal of said switch means being coupled to said rotatable coil,
capacitor means having one side coupled to said secondary windings and an opposite side coupled to said second terminal of said switch means,
lead means coupled between said DC power supply and said second terminal, and
control means coupled to said output of said regulator means for closing said switch means when the output of said DC power supply drops to a given level for coupling said opposite side of said capacitor means and said lead means to said rotatable coil.

12. The system of claims 1 or 6 wherein said multi-phase system comprises an annular stationary stator with a rotor concentrically located therein, said stationary stator comprising:
an annular structure formed of ferro-magnetic material defining an annular stator core having forty-two segments with adjacent segments being separated by a slot such that there are forty-two slots which extend in a direction parallel to the axis of said stator core, and
a three phase stator winding connected in a delta configuration,
each phase comprising a winding having fourteen coils extending around said stator core on the inside thereof,
each of said coils of each phase winding comprising a plurality of turns of wire encircling three segments,
said fourteen coils of each phase winding having a plurality of turns located in fourteen of said slots such that said fourteen slots for each phase winding respectively have the following number of turns located therein 9, 9, 9, 9, 9, 9, 9, 9, 9, 9, 9, 9, 9, 9.

13. The system of claims 1 or 6 wherein said multiphase system comprises an annular stationary stator with a rotor concentrically located therein, said stationary stator comprising:
   an annular structure formed of ferro-magnetic material defining an annular stator core having forty-two segments with adjacent segments being separated by a slot such that there are forty-two slots which extend in a direction parallel to the axis of said stator core, and
   a three phase stator winding connected in a delta configuration,
   each phase comprising a winding having fourteen coils extending around said stator core on the inside thereof,
   each of said coils of each phase winding comprising a plurality of turns of wire encircling three segments,
   said fourteen coils of each phase winding having a plurality of turns located in fourteen of said slots such that said fourteen slots for each phase winding respectively have the following number of turns located therein 9, 9, 9, 9, 9, 9, 9, 9, 9, 9, 9, 9, 9, 9,
   said fourteen coils of each phase winding respectively having the following number of turns at one edge of said winding located outside of said slots on one side of said core, 4, 4, 5, 4, 5, 4, 5, 4, 5, 4, 5, 4, 5, 4,
   said fourteen coils of each phase winding respectively having the following number of turns at the other edge of said winding located outside of said slots on the other side of said core, 4, 5, 4, 5, 4, 5, 4, 5, 4, 5, 4, 5, 4, 5.

* * * * *